(12) United States Patent
Burkule et al.

(10) Patent No.: US 11,301,454 B2
(45) Date of Patent: Apr. 12, 2022

(54) SYSTEM AND METHOD FOR CONSISTENCY CHECKS IN CLOUD OBJECT STORES USING MICROSERVICES

(71) Applicant: EMC IP Holding Company LLC, Hopkinton, MA (US)

(72) Inventors: Shyam Burkule, Santa Clara, CA (US); Kalidas Balakrishnan, San Jose, CA (US); Ramprasad Chinthekindi, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 217 days.

(21) Appl. No.: 16/657,993

(22) Filed: Oct. 18, 2019

(65) Prior Publication Data

US 2021/0117406 A1 Apr. 22, 2021

(51) Int. Cl.
| | |
|---|---|
| *G06F 7/00* | (2006.01) |
| *G06F 16/23* | (2019.01) |
| *G06F 16/27* | (2019.01) |
| *H04L 67/1097* | (2022.01) |
| *H04L 67/06* | (2022.01) |
| *G06F 11/14* | (2006.01) |

(52) U.S. Cl.
CPC ...... *G06F 16/2365* (2019.01); *G06F 11/1464* (2013.01); *G06F 16/275* (2019.01); *H04L 67/06* (2013.01); *H04L 67/1097* (2013.01); *G06F 2201/84* (2013.01)

(58) Field of Classification Search
CPC ............... G06F 16/2365; G06F 16/275; G06F 11/1464; G06F 2201/84; H04L 67/06; H04L 67/1097
USPC .................................................. 707/600–899
See application file for complete search history.

(56) References Cited

U.S. PATENT DOCUMENTS

2013/0117240 A1 * 5/2013 Taylor ................... G06F 16/182
707/690

* cited by examiner

*Primary Examiner* — Isaac M Woo
(74) *Attorney, Agent, or Firm* — Staniford Tomita LLP

(57) ABSTRACT

A microservice or serverless process consistency check process comprising locating all the necessary metadata and data objects in the cloud by storing the data objects in the cloud and synchronously mirroring the metadata, which is separately stored in local storage, to the cloud. The process generates a list of data objects in the cloud as "Set A" and the list of metadata objects in the same prefix range as the data objects as "Set B." The consistency check then verifies whether all objects in Set A are referred to by objects in set B. In the case where there are gaps between the sets, non-existent objects are marked as missing, and unreferenced objects are marked as orphan objects. The list of missing and orphan objects is then sent back to the backup server for analysis and further processing.

9 Claims, 8 Drawing Sheets

SYSTEM AND METHOD FOR CONSISTENCY CHECKS IN CLOUD OBJECT STORES USING MICROSERVICES

TECHNICAL FIELD

This invention relates generally to deduplication storage systems, and more particularly to systems and methods for performing consistency checks in cloud storage using microservices or serverless compute functions.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms easier and more reliable. Large-scale cloud computing infrastructure and services are often provided by cloud providers that maintain data centers that may be located long distances from many of the users. Cloud networks are widely used for large-scale data backup operations by enterprises that process large amounts of data on a regular basis, such as weekly or daily company-wide backups, and cloud storage is typically associated with long-term storage of data that is stored for archival purposes and infrequently accessed, in contrast to local network storage, which is associated with presently processed data.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Certain cloud-based deduplication systems, such as the Data Domain from DellEMC cloud system use a metadata-separated architecture. As a storage of last resort, it is very important for the Data Domain File System (DDFS) to ensure the objects corresponding to the metadata exists in the cloud and vice versa. This consistency is vital in deduplication backup systems as a single missing object can potentially impact multiple user files. This also means that it is important to detect the data loss as early to provide more leverage to recover from data loss. For example, the system can re-backup the files if the backup client did not expire the files. After file expiration, such recovery is much more difficult. Present existing solutions to check data consistency on the cloud tier is inefficient because of two fundamental factors. The first factor is limited system resources, which means that object consistency checks to process huge number of objects is very inefficient. For example, a solution that runs on the on-premises Data Domain system shares the core DDFS resources such as memory and network bandwidth, and thus usually runs at the lower priority. The second factor is that current solutions list the data objects from the cloud to the on-premises data appliance. If the cloud tier size is 1 petabyte (PB), and assuming a 1 MB object size, the cloud tier could have about 1 billion data objects and about 10 million metadata objects (for ~1 metadata object per 100 data objects), as just one example. The listing of these many objects over the network is limited by network bandwidth and latency.

What is needed, therefore, is a more efficient method to check data consistency for deduplication backup systems operating with cloud-based object storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
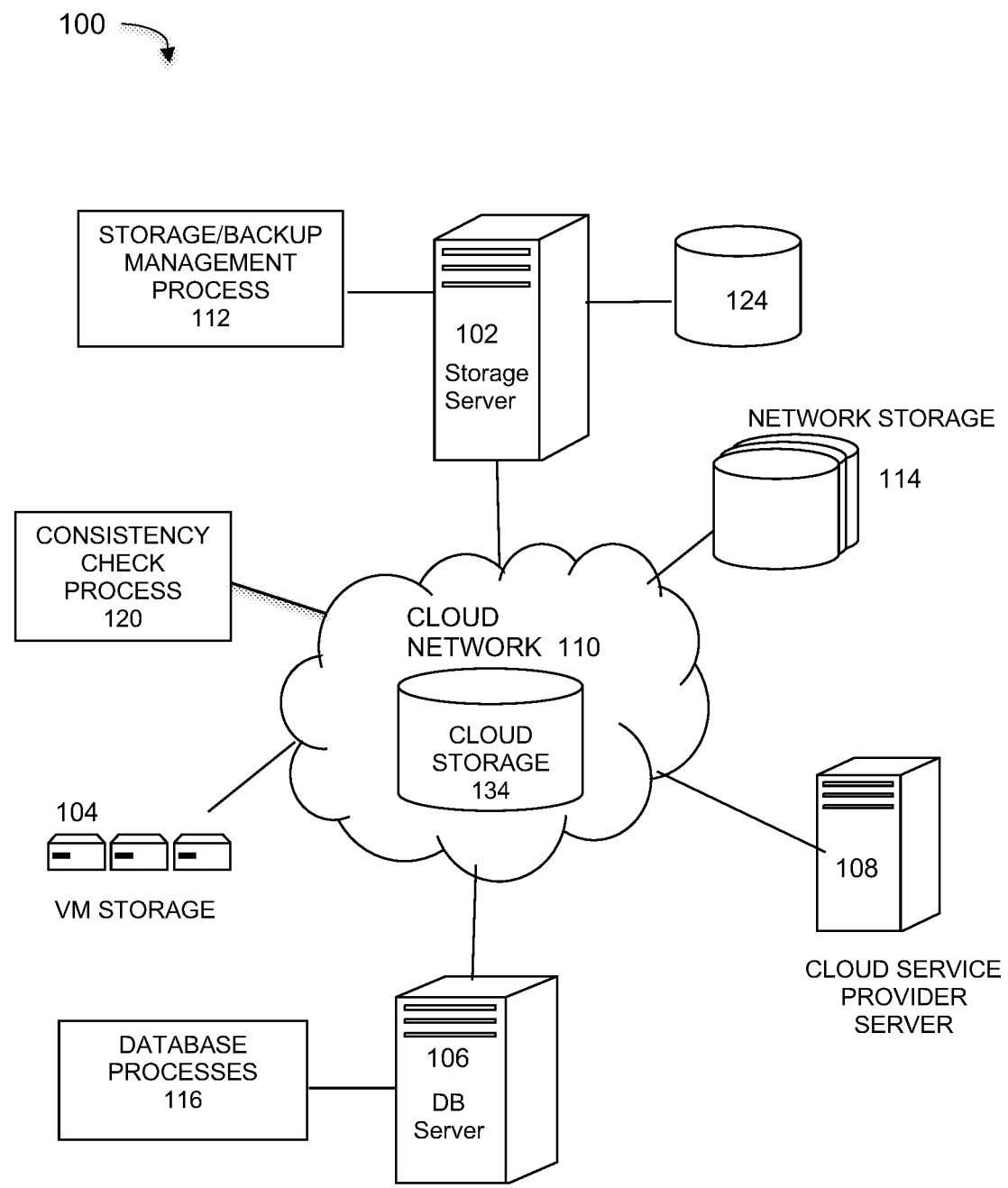
FIG. 1 is a diagram of a cloud computing network implementing an instant replay process for moving a file to a cloud tier in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a data object consistency check process that runs as a microservice in the cloud or as a serverless compute function to form a consistency check system. The process receives the instruction from the Data Domain File System to perform the consistency check. This eliminates the network transfer, thus making the consistency check process faster. The microservice or serverless-compute process consolidates all the results and send it back to the DDFS server for further analysis and action. As this solution runs as a microservice/serverless-compute, on separate compute instance, it does not share the Data Domain File System resources. The cost of running this service on the compute instance of any cloud provider is less than the cost incurred by ingress/egress of data transfer from the cloud network.

FIG. 1 illustrates a computer network system that implements one or more embodiments of a cloud storage network system implementing a data consistency check process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 may be a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, cloud network 110 may include cloud storage resources 134. In general, cloud storage is a model of data storage in which the data is stored in logical pools. The physical storage spans multiple servers, and the physical environment may be owned and managed by a hosting company 108 that keeps the data available and accessible, and the physical environment protected and running. The cloud storage 134 may be implemented as a hosted object storage service, but can also include other types of data storage that are available as a service, such as block storage.

Unstructured data is often stored in cloud storage in a cloud object storage format or simply object storage format. Object storage architecture stores and manages data as objects compared to block storage, which handles data as blocks, and logical volumes and file storage which store data in hierarchical files, and is appropriate for cloud applications because it is elastic, flexible and it can more easily scale into multiple petabytes to support virtually unlimited data growth. Object storage is not particularly suitable for storage applications with high transactional rates, as it is generally not consistent enough for real-time systems such as transactional databases. For long-term or archival storage of large amounts of data, however, it offers significant advantages over block and file-based storage.

The object storage format includes a globally unique identifier for each object along with customizable metadata that is separated to enable other capabilities such as application and user-specific data for indexing. An object identifier is an address tied to the object, which enables the object to be found over a distributed system. Objects may be spread across multiple data centers and data can be found without the user knowing the specific physical location of the data. Object storage, along with the metadata, can be accessed directly via application program interfaces (APIs), HTTP and HTTPS. That differs from block storage volumes, which only can be accessed when they are attached to an operating system.

In object storage systems, the data is bundled with the metadata tags and the unique identifier. These objects are stored in a flat address space, making it relatively easy to locate and retrieve the data. This flat address space storage thus helps eliminate the complexity and scalability challenges of hierarchical file system architectures.

Figure 2:
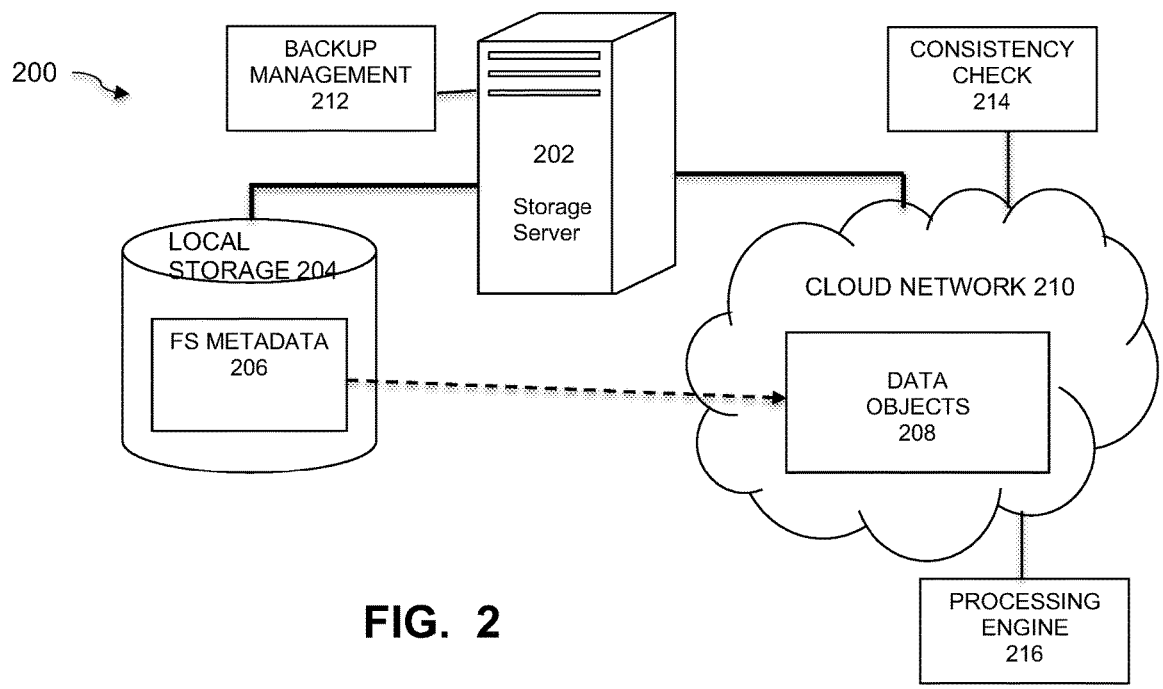
FIG. 2 illustrates meta separated architecture that is used to implement a consistency check process, under some embodiments.

In an embodiment, system 100 represents a Data Domain system that uses cloud object storage 134 as the target storage for the deduplication backup process 112. For this embodiment the filesystem metadata is stored in a local storage and the data itself is stored in cloud storage. This separation of storage of metadata versus the actual data is referred to as metadata separated or meta separated architecture. FIG. 2 illustrates meta separated architecture that implements a consistency check process, under some embodiments. As shown in diagram 200, a storage server 202 maintains local storage 204 and accessed cloud network 210. The file system metadata 206 is stored in the local storage 204, mainly for performance benefits and for minimizing the cloud access (dollar) costs. The metadata includes references to the data objects 208 written into the cloud 210. The backup management process 212, which may utilize DDFS, uses the metadata 206 in the local storage for its deduplication decisions, dead-data removal, file verification, optimized replication, and other backup functions. The consistency of the metadata 206 in the local storage 204 is important for the accurate functioning of the DDFS.

FIG. 2 illustrates a storage system using metadata-separated architecture that can leverage cloud object store as target storage. Here, all the filesystem metadata is stored in local storage 206, which can be block-based storage, and the file data 208 is written as an object in the cloud. The metadata objects are synchronously mirrored to the cloud 210 for the disaster recovery (DR) use cases. The data object in the cloud follows a format recommended by the cloud provider that allows them to load balance I/Os across multiple partitions. Each local metadata block may refer more than one data object in the cloud (typically several random objects). The metadata portion of multiple data objects is grouped together in a container, referred to as a CMETA container. In DDFS or similar file systems, the underlying storage filesystem is log-structured which means each consecutive block that is allocated will carry a monotonically increasing logical ID. This logical ID is embedded in the object naming for future retrieval. The DDFS applies a mark and sweep algorithm for dead data removal and copy-forwards the live metadata in the local storage. This result in random holes in the logical ID order and the metadata blocks will refer to random data objects.

Figure 3:
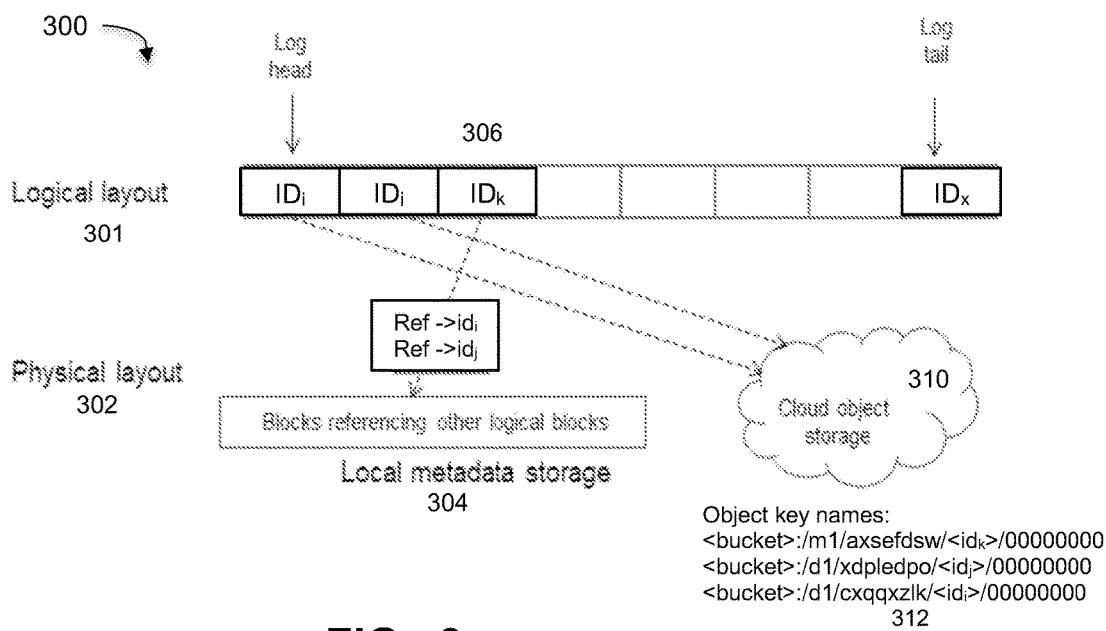
FIG. 3 illustrates an example of a log-structured, metadata-separated architecture for cloud storage, under some embodiments.

FIG. 3 illustrates an example of a log-structured, metadata-separated architecture for cloud storage, under some embodiments. As shown in diagram 300, the logical layout 301 of the data blocks comprises blocks with IDs denoted $ID_1$ to $ID_X$. The physical layout 302 of these data blocks comprise blocks referencing other logical blocks stored in local metadata storage 304. The cloud object storage 310 stores the object key names. The logical layout indicates metadata objects that are serially allocated. Multiple such metadata objects are grouped together in a container (called CMETA) and written to the physical local storage. These metadata objects reference the data objects which contain the actual data and that is written to the cloud.

Certain inconsistencies may result from normal operation of this type of cloud-based system. Embodiments provide an efficient way to detect at least two common types of inconsistencies that are known to cause problems. The first type of inconsistency are missing objects, which results from having a metadata object in the local storage that refers to objects in the cloud object storage. If these objects are deleted inadvertently in the cloud (either due to some bug in the cloud provider or storage failure, or any other reason), there will be references from local metadata objects to the objects in the cloud for objects that do not actually exist. The second type of inconsistency are orphaned objects, which result when a copy forward of local metadata with references to live objects in the cloud from one local metadata object to another metadata object is followed by a delete of the dead objects in the cloud that also deletes the source local metadata objects. If, for some reason, the process cannot delete the dead object in the cloud, these objects become orphaned and they are not reachable from local metadata storage. Such orphaned objects (or "orphans") cause space leakage in the cloud object storage.

As shown in FIG. 2, system 200 includes an object consistency check process 214 that runs as a microservice in the cloud 210 or as a serverless compute function to detect these inconsistencies efficiently. The service 214 receives the instruction from the backup management system 212 (e.g., DDFS) to perform the inconsistency detection. The process 214 uses containers (microservices) or serverless compute functions to walk the local metadata and detect both types of inconsistencies. By using microservices or serverless computes, this system 200 eliminates a network transfer, thus making the consistency check process faster. The consistency check microservice or serverless process 214 consolidates all the results and sends it to the backup server 202 for further analysis and action. As this solution runs as a microservice/serverless-compute, on separate compute instances, it does not share the storage network file system (e.g., DDFS) resources. The cost of running this service on the compute instance of any cloud provider is generally less than the cost incurred by ingress/egress of data transfer from the cloud.

In an embodiment, system 200 of FIG. 2 also includes a processing engine 216 to execute or perform some of the functions of the consistency check process 214. This processing engine may be embodied in certain hardware processing resources of the cloud 210. Alternatively, at least some of the processing functions may be provided by the hardware of server 202, or any other computer resource coupled to or part of cloud 210. As described above, there are essentially two types of objects: metadata objects and data objects. A metadata object has references to data objects and multiple such metadata objects are grouped together in one object. These metadata objects are available in local storage as well as mirrored in the cloud. The data object contains actual user data. These objects are only available in the cloud. The primary function of processing engine 216 is to ensure that all references in metadata, which are data objects, exist in the cloud. This is called as forward consistency and any inconsistency in this operation will indicate the data loss. The processing engine 216 also ensures backward consistency, meaning all data objects are referenced by metadata objects. If data objects exist but do not have references in metadata, they are orphaned data objects. Such objects are occupying the space in cloud and can be safely deleted. As a microservice, process 214 move computes functions in order to: (1) avoid downloading data from cloud to check for consistency (which saves costs), and (2) detecting a consistency problem earlier so that the system can recover if possible, and (3) move the compute function so that it will not consume any on-premises resource, which could otherwise will be used for deduplication processing.

The consistency check process 214 is provided as a microservice or a serverless compute function. As such it is an application that is structured as a fine-grained, light-weight protocol, and small application program. It is configured to detect data loss and other similar problems as early as possible without consuming the on-premises resources. It can further be configured to add additional functionality, such as analytics, feedback, and so on. In an example, a serverless compute function in an AWS (Amazon Web Service) is known as a Lambda function, on an Azure platform it is an Azure function, and on a Google cloud it is known as a serverless function or a cloud function. For a microservice, the process can be implemented by spinning up a Docker container compute instance and checking for file system consistency. Either or both types of compute instances serverless or microservices) can be used to perform the consistency checks. Furthermore, other similar implementations of either compute instance may be used, other than the specific examples mentioned.

As explained above, the metadata objects are required to be available in the cloud for the consistency check to run. The metadata objects are synchronously mirrored to the cloud and data objects are directly written to the cloud. In this case, all objects needed to run the consistency check are available in the cloud. Based on a defined policy, the backup server 202 sends an instruction to the consistency check microservice 214 to start the object consistency check process.

Figure 4A:
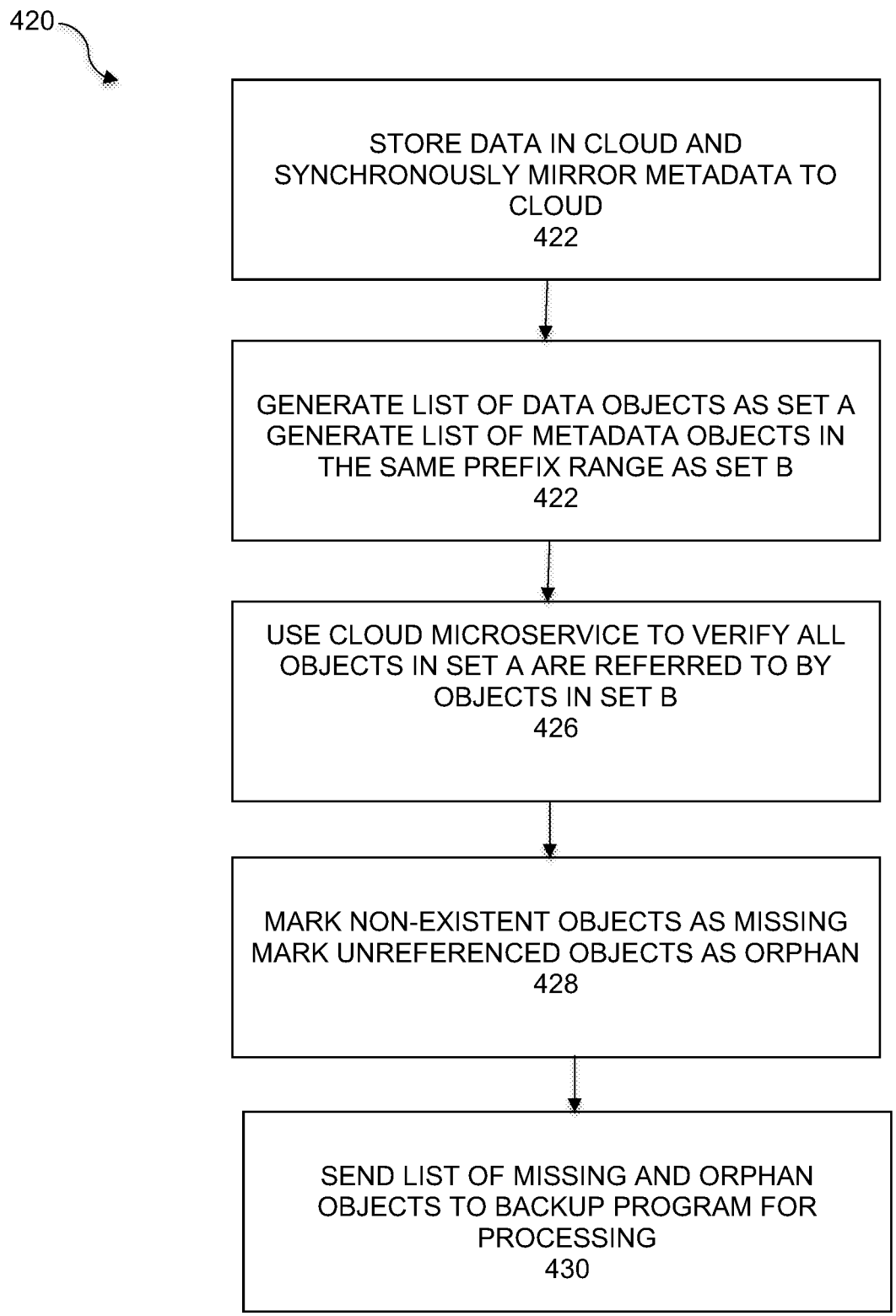
FIG. 4A is an overall process of a method of performing an object consistency check, under some embodiments.

FIG. 4A is an overall process of a method of performing an object consistency check, under some embodiments. Process 420 starts with locating all the necessary metadata and data objects in the cloud for processing by a cloud-based process (microservice or serverless compute function). Thus, in step 422, the process stores the data objects in the cloud and synchronously mirrors the metadata, which is separately stored in local storage, to the cloud. This brings the data, metadata, and microservice all on the cloud. In step 424, the process generates a list of data objects in the cloud as "Set A" and the list of metadata objects in the same prefix range as the data objects as "Set B," step 426. The prefix is used to define a range to process the metadata objects. The prefix width is determined by available memory. The wider the prefix, the fewer rounds of metadata processing is required. The consistency check microservice then verifies whether all objects in Set A are referred to by objects in set B, step 428. In the case where there are gaps between the sets, non-existent objects are marked as missing, and unreferenced objects are marked as orphans, step 428. The list of missing and orphan objects is then sent back to the backup server (e.g., DDFS server) for analysis and further processing, if necessary, step 430.

Figure 4B:
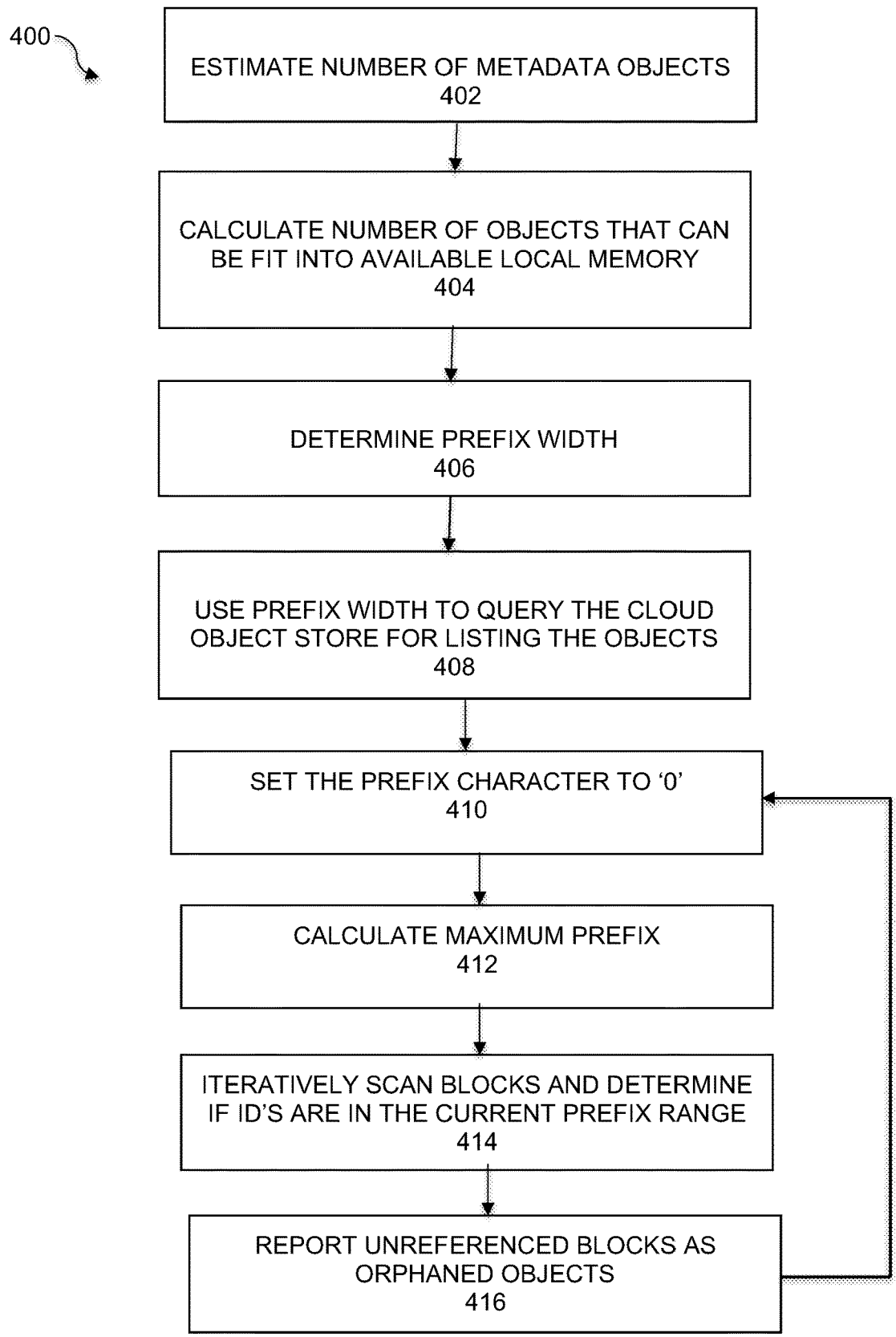
FIG. 4B is a flowchart that illustrates a method of performing an object consistency check using a cloud microservice, under some embodiments.

FIG. 4B is a flowchart that illustrates a method of performing an object consistency check using a cloud microservice, under some embodiments. Process 400 starts by estimating the number of metadata objects, step 402. It then calculates the number of objects that can be fit in the available memory, step 404. In step 406, a prefix width is calculated. The prefix width is determined as per the programming code example below:

```
if memory-can-hold >= num_of_objects
    prefix-width = 0
else
    prefix-width = ((number of objects/(16ⁿ)) <= memory-can-hold)
    /* 16 is a possible combination of a hex-decimal char*/
```

This prefix width is used to query the cloud object store for listing the objects, step 408. For example:
Number of objects=1000000 (1 million).
Available memory=4 MB which fits total 4096 objects.
Hash-key-width=8 hex characters, each char can have possible 16 characters.
Query prefix-width=2.
In this example, the prefix width is calculated as: 1000000/$16^n$~=4000 (approx.) is less than 4096, and n is prefix width.

The process then sets the start prefix character to "0" step 410. Based on the width, the prefix character set then expands. For example, if the query prefix width=2, then the start prefix is 00. If the query prefix width=3 then the start prefix is 000 and so on. In step 412, the process calculates the maximum prefix based on the query prefix width. For example, for a query prefix width=1, the maximum prefix is 0xf, for a query prefix=2, the maximum prefix is 0xff, and so on.

The process then starts an iterative sub-process to see whether blocks are within the current prefix range, block 414. Details of this sub-process are as follows:

From I=start prefix to max prefix, do the following
(a) List objects based on the prefix and store them in the memory.
(b) Scan the CMETA blocks and generate a hash for each logical-ID and determine if it falls in the current prefix range. If yes, look up in the objects listed in step (a) above. If no, ignore this logical-ID. If the lookup fails, report the logical-ID for the block as a missing object.

Objects for which the look-up fails, or otherwise do not have the reference are reported as orphaned objects, step 416. This sub-process repeats from step 410 until all prefixes are covered, that is from I=start prefix to the maximum prefix.

The results of process 400 (of FIG. 4A) generate a list of data objects. This list, referred to as "Set A" is sent to a processing engine, such as processing engine 216 of FIG. 2.

Figure 4C:
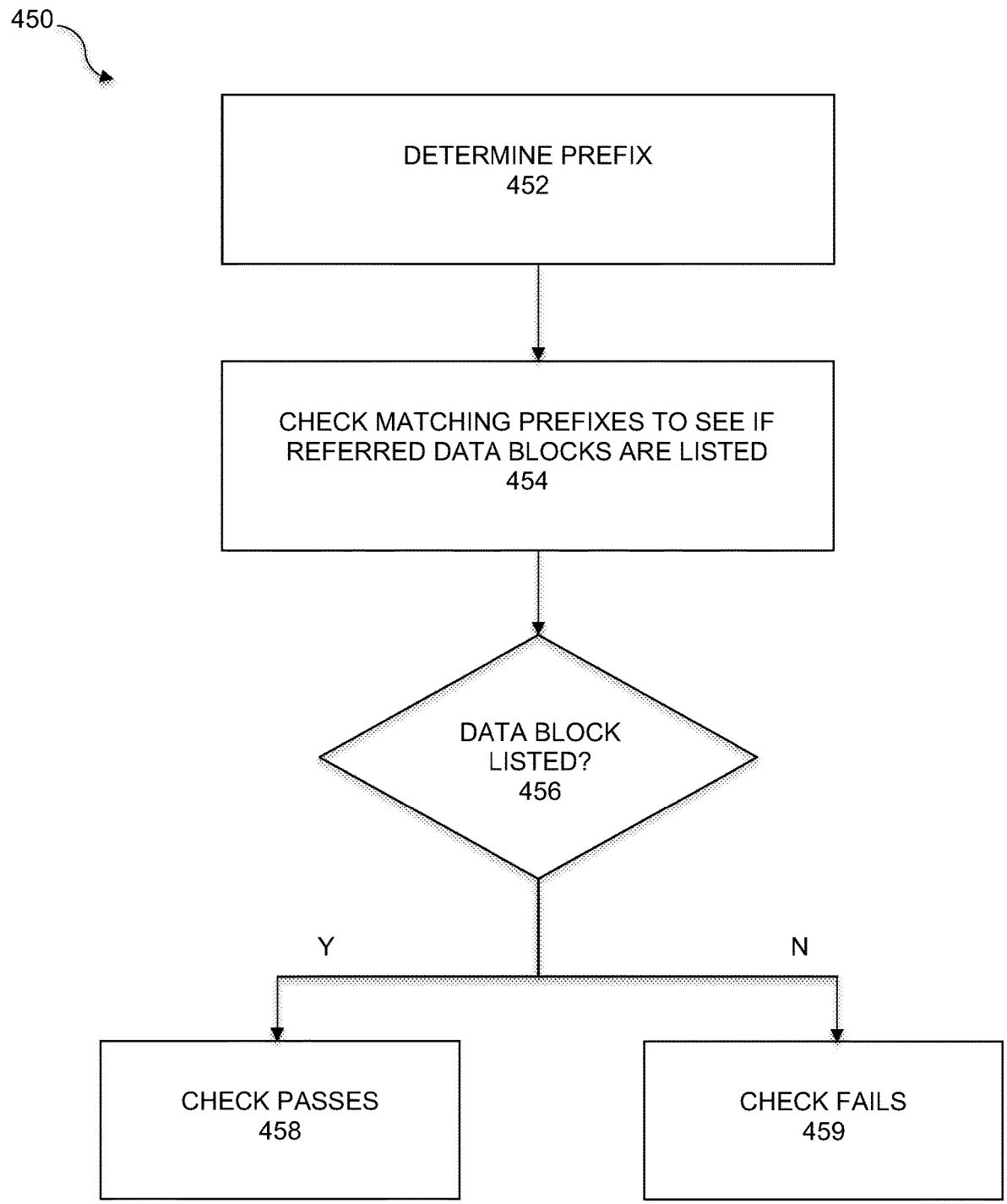
FIG. 4C illustrates an overall process of performing a consistency check and generalizes the processes of FIGS. 4A and 4B, under some embodiments.

An overall process of performing a consistency check and generalizing the processes of FIGS. 4A and 4B is illustrated in FIG. 4C. The overall process is to first determine the prefix, step 452. The process lists all the data objects that have the same prefix as a current prefix. It then goes through the metadata blocks, and for all metadata blocks whose ID prefix matches the current prefix, it checks to see if it's referred data blocks are available in the list or not, step 452. If they are available, as determined in decision step 456, it passes the consistency check 458, otherwise it fails and is marked as a lost data object that needs to be recovered, step 459.

Figure 5:
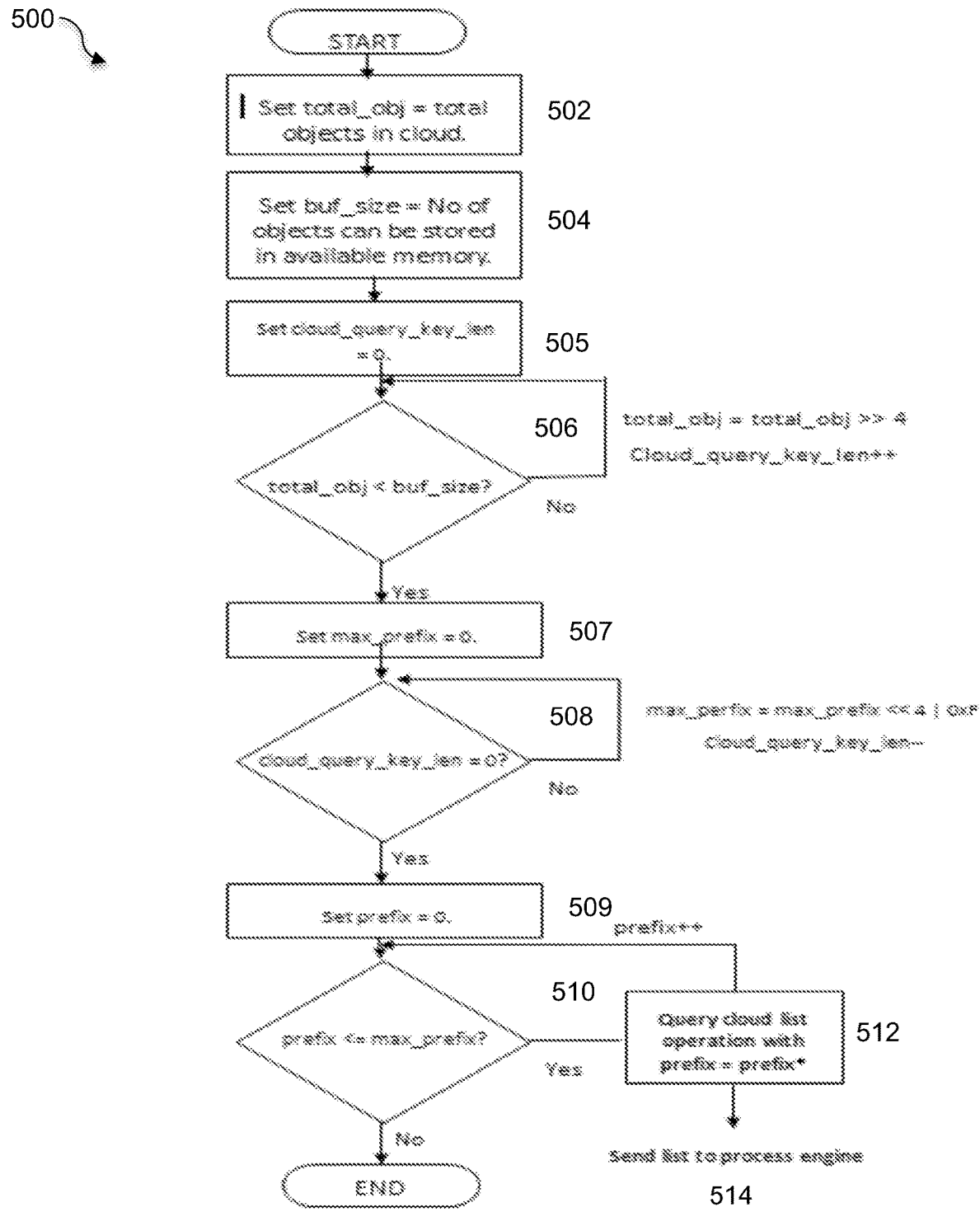
FIG. 5 is a flowchart that illustrates the process of FIG. 4A in greater detail and expressed as programming code syntax, under some embodiments.

FIG. 5 is a flowchart that illustrates the process of FIG. 4A in greater detail and expressed as programming code syntax, under some embodiments. Process 500 begins by setting the total number of objects equal to the total objects in the cloud, step 502. The buffer size is then set to the number of objects that can be stored in available local memory (e.g., 204), step 504. The process then executes an iterative loop 506 which determines whether the number of total objects is less than the buffer size, over an increasing query key length that is originally set to 0 in step 505. Once decision block 506 returns a 'Yes' result, the process executes iterative loop 508 which determines whether the cloud query key length is equal to zero over a decremented value after the maximum prefix is set to zero in step 507. Once decision block 508 returns a 'Yes' result, the process executes iterative loop 510 which determines whether the prefix is less than or equal to the maximum prefix once the prefix is set to 0, step 509. If, in decision block 510, it is determined that this condition is 'no' the process 500 ends. Otherwise, the process queries the cloud list operation with prefix equal to prefix*, step 512 and increments the prefix value. The list from step 512 is then set to the process engine, step 514. In FIG. 5, the following terms are defined as follows:

Prefix=the starting few or all characters of an ID.
Prefix-width=the number of characters in the prefix.
Cloud-query-len=The length of the prefix used to query the cloud data objects.
Max-objects=the maximum number of objects can be fit into memory.

Figure 6:
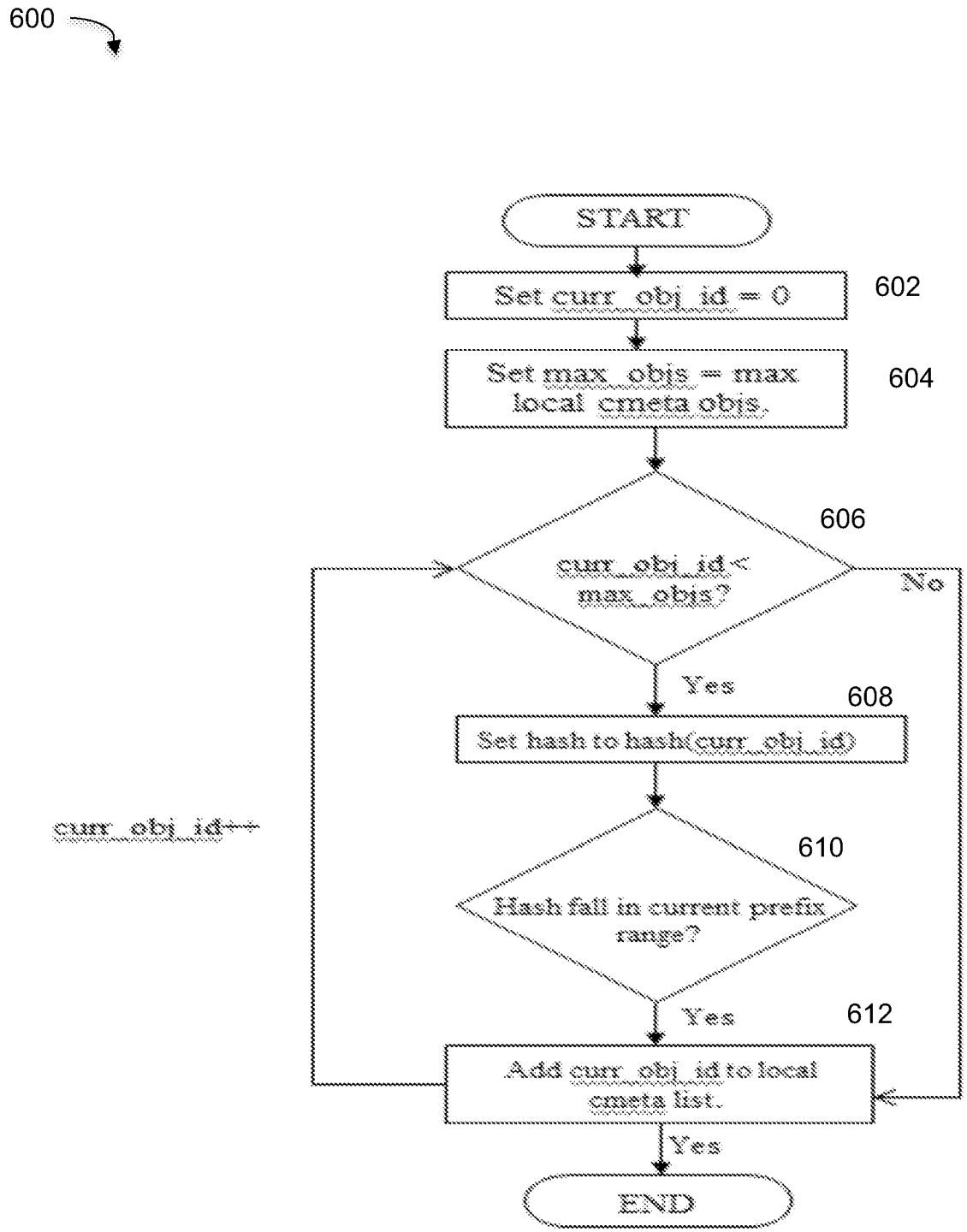
FIG. 6 is a flowchart that illustrates listing registered data objects using a consistency check process, under some embodiments.

FIG. 6 is a flowchart that illustrates listing registered data objects using a consistency check process, under some embodiments. This process lists metadata objects from mirror copy in the cloud that fall in the same prefix range and stores it a list referred to as "Set B." As shown in FIG. 6, process 600 begins by setting the current object ID equal to zero, step 602. The maximum objects is then set equal to the maximum local metadata objects, step 604. Determination step 606 determines whether the current object ID is less than the maximum objects value. If so, the has is set to the hash of the current object ID, step 608. The process then determines whether the hash falls within the current prefix range, step 610. If so, the current object ID is added to the local CMETA list, step 612. The process iterates over steps 606 to 610 for increasing current object ID values. The resulting CMETA list in step 612 then comprises Set B.

The processing engine 216 verifies that all objects in the Set A (from process 500) are referred by objects in the Set B (from process 600). The objects that are referred by Set B and do not exist in the Set A are marked as missing objects. The objects in the set A that do not have a reference in the Set B are marked as an orphan object. The list of missing objects (potential data loss) and orphaned objects (dead objects) is sent back to the Data Domain system for further analysis and action.

System Implementation

Embodiments of the processes and techniques described above can be implemented on any appropriate backup system operating environment or file system, or network server system. Such embodiments may include other or alternative data structures or definitions as needed or appropriate.

Figure 7:
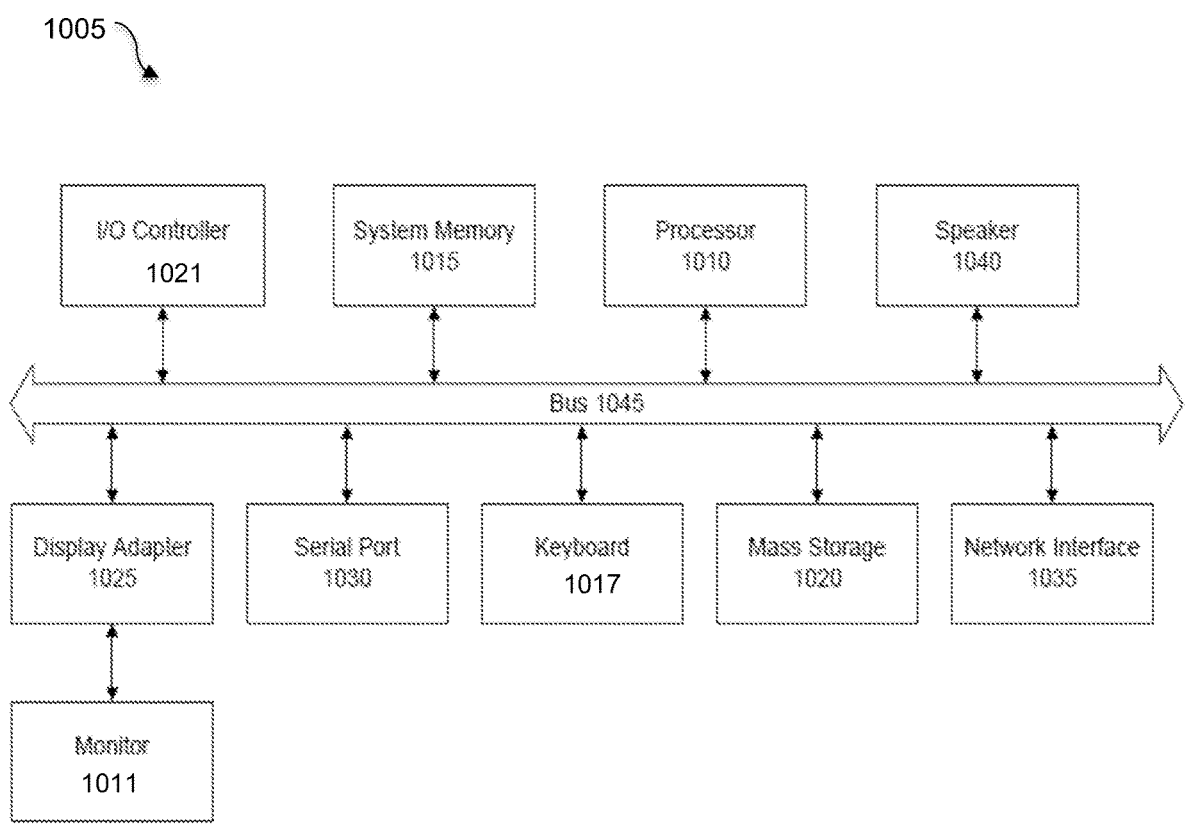
FIG. 7 is a system block diagram of a computer system used to execute one or more software components of the consistency check process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
    storing file system metadata for individual data objects in a block storage device local to a server computer;
    storing the individual data objects in cloud-based storage coupled to the server computer;
    synchronously mirroring the metadata to the cloud-based storage;
    defining a prefix to define a range of metadata objects to process, the prefix comprising a first number of characters of an ID of metadata objects in the range;
    determining a width of the prefix, wherein the width comprises a number of characters in the prefix and is determined by an amount of available memory, and wherein a wider range results in fewer metadata object processing steps;
    generating a first list of data objects in the cloud, and a second list of metadata objects in the same prefix range as the data objects using the prefix width to query the cloud for at least one of the first list and second list;
    verifying, in a cloud-based consistency check process, that all objects in the first list are referred to by objects in the second list;
    marking non-existent objects as missing and marking unreferenced objects as orphan objects; and
    sending a list of missing and orphan objects to a backup process of the server computer.

2. The method of claim 1 wherein the cloud storage comprises storage media resident in a cloud computing network maintained by a cloud service provider, and provided for long term retention of the data objects.

3. The method of claim 2 further comprising grouping the metadata in a container.

4. The method of claim 3 wherein the metadata includes references to corresponding data objects of the individual data objects.

5. The method of claim 2 wherein the consistency check process is performed as a microservice in the cloud computing network.

6. The method of claim 2 wherein the consistency check process is performed as a serverless compute function in the cloud computing network.

7. The method of claim 2 wherein the missing objects comprise data blocks having a metadata object in the local storage that refers to objects in the cloud object storage, and that are deleted inadvertently leaving references from local metadata objects to cloud objects that do not actually exist.

8. The method of claim 2 wherein the orphan objects comprise objects that result when a copy forward of local metadata with references to live objects in the cloud from one local metadata object to another metadata object is followed by a delete of dead objects in the cloud that also deletes source local metadata objects.

9. The method of claim 1 wherein the backup process comprises a deduplication backup process executed by the server computer running a Data Domain file system (DDFS).

* * * * *